United States Patent [19]

McElroy et al.

[11] Patent Number: 5,039,139
[45] Date of Patent: Aug. 13, 1991

[54] TUBE SPRING STEEL TAB LOCK COUPLING CONNECTOR AND METHOD FOR CONNECTING TELESCOPING TUBES

[75] Inventors: Donald J. McElroy, Fenton; Harry W. Zarvos, Farmington Hills, both of Mich.

[73] Assignee: Ford Motor Company, Dearborn, Mich.

[21] Appl. No.: 469,993

[22] Filed: Jan. 25, 1990

[51] Int. Cl.⁵ ............................................. F16L 37/00
[52] U.S. Cl. ...................................... 285/319; 285/7; 285/233; 285/307
[58] Field of Search .................. 285/29, 31, 145, 244, 285/319, 330, 307, 302, 921, 7, 233

[56] References Cited

U.S. PATENT DOCUMENTS

| | | |
|---|---|---|
| 136,397 | 3/1873 | Westinghouse . |
| 517,192 | 3/1894 | Prior . |
| 718,599 | 1/1903 | Bubb . |
| 1,538,007 | 5/1925 | Schellin . |
| 2,514,504 | 7/1950 | Moline ................... 248/56 |
| 3,588,149 | 6/1969 | Demler et al. ............. 285/110 |
| 3,603,621 | 9/1971 | Parsons ..................... 285/319 |
| 4,055,359 | 10/1977 | McWethy .................. 285/318 |
| 4,401,326 | 9/1983 | Blair ........................ 285/318 |
| 4,637,640 | 1/1987 | Fournier et al. ............ 285/319 |
| 4,681,351 | 7/1987 | Bartholomew ............. 285/319 |
| 4,778,203 | 10/1988 | Bartholomew ............. 285/111 |
| 4,786,085 | 11/1988 | Sauer et al. ................ 285/24 |
| 4,802,697 | 2/1989 | Bartholemew ............. 285/319 |
| 4,913,467 | 4/1990 | Washizu ..................... 285/319 X |
| 4,944,536 | 7/1990 | Bartholemew ............. 285/319 |

OTHER PUBLICATIONS

Metal Stamping Design, Carlson, R. F., 1961, Prentice Hall, pp. 36-37, 180.

*Primary Examiner*—Peter M. Cuomo
*Assistant Examiner*—Timothy Aberle
*Attorney, Agent, or Firm*—Randolph A. Smith; Clifford L. Sadler

[57] ABSTRACT

A coupling (10) is disclosed for joining together a first tube (12) and a second tube (14) to form a continuous fluid passageway. The first tube (12) has a mount (20) a predetermined distance from its end (18) and the second tube (14) has a return bend on its end (36). Second tube (14) telescopically fits over first tube (12). A cage (22) having inclined locking tabs (30) is mounted by mount (20) externally of first tube (12). Locking tabs (30) cam to allow the return bend (36) of second tube (14) to pass the locking tabs (30). Tabs (30) return to their at rest inclination after the return bend (36) passes, to trap the return bend (36) between the locking tabs (30) and mount (18), thereby locking the first and second tubes (12,14) against disconnection and providing a visible connection to allow verification of the connection.

17 Claims, 2 Drawing Sheets

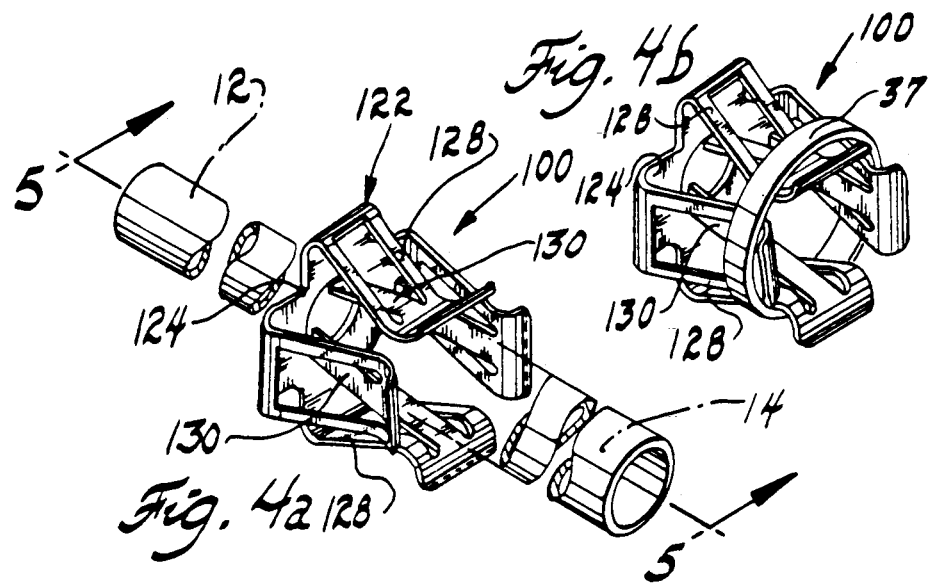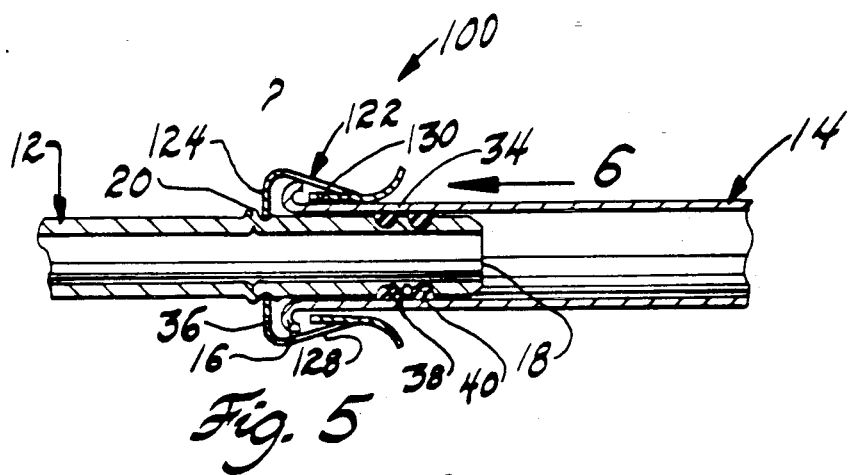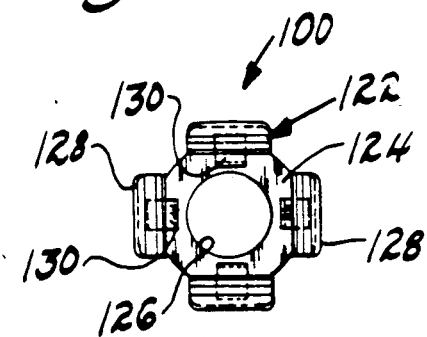

1

TUBE SPRING STEEL TAB LOCK COUPLING CONNECTOR AND METHOD FOR CONNECTING TELESCOPING TUBES

TECHNICAL FIELD

This invention relates to a coupling for joining tubes that carry fluid and, more particularly, to quick connect and quick disconnect couplings.

BACKGROUND ART

Tube couplings are used to join tube ends to form a continuous fluid passageway. Often this joining is done in connection with a production operation. The time it takes to perform the coupling is important as is the integrity of the connection.

Tube couplings, such as those disclosed in U.S. Pat. Nos. 4,681,351; 4,401,326; and 4,055,359 have been provided to simplify connecting two tube ends for fluid communication. With these and other well-known tube coupling connectors, it is impossible to visualize the connection. Oftentimes, after a connection is made, the connection is not yet completed. The difficulty with these connections often arises because of frictional contact between rubber O-rings which must be compressed between the tubes in order to provide the requisite seal.

Conventional coupling connections are made by an operator providing an axial force to one of the tubes and a resistance force in the opposite direction to the other tube. Often the coupling gives the appearance of a properly connected coupling because the frictional forces between the tube ends hold the tube ends in substantially the same relative position as they would have if the connections were properly made. Although the tube ends may appear and feel as if a proper connection were made, the improper connection results in the tube ends working their way loose over time and eventually leaking.

DISCLOSURE OF INVENTION

An object of the present invention is to provide a coupling with which, when connected, the coupling members are visible so that the connection can be visually inspected as the connection is performed.

Another object of the invention is to provide a coupling which can be easily disconnected for servicing and performing maintenance.

A further object of the invention is to provide a coupling which is inexpensive to manufacture vis-a-vis conventional couplings.

A still further object of the invention is to provide a coupling which generates savings for coupling assemblies.

A more specific object of the invention is a coupling for joining first and second tubes which comprise a first tube with an end portion having a terminal end and a mounting means a predetermined distance from said terminal end; a cage externally of the end portion on said mounting means in axially inwardly spaced relation to said terminal end, wherein the cage comprises a radial base portion having a circular aperture through which the first tube end portion projects, a plurality of spaced legs extending generally perpendicularly and connected to the base portions, and a locking tab extending at an inclination from each said leg toward said aperture in said base; and a retaining band circumferentially enveloping said spaced legs; a second tube with an end portion having a terminal end telescopically mountable on the first tube end portion, and a return bend on said terminal end, locking tab of the cage when the second tube is telescopically mounted on the first tube to prevent disconnection of the first and second tube ends.

In carrying out the above objects and other objects of the invention, a coupling constructed in accordance with the present invention is used for coupling together first and second tube ends to form a continuous fluid passageway. The first tube has an end portion including a terminal end and also a mounting means a predetermined distance from its end. The second tube has an end portion, including a terminal end having a return bend, which telescopically fits over the first tube end. A cage including a radial base portion and having an aperture therein mounts the cage by the mounting means externally on the first tube.

In a first embodiment of the coupling, the radial base portion includes a wall extending generally perpendicularly to the base portion. The wall includes a locking tab which extends from the wall at an inclination from the wall toward the aperture in the base. The locking tab engages the return bend on the second tube end when the first and second tube ends are coupled together to prevent disconnection of the first and second tube ends.

Preferably, the cage is of a spring steel material and of a one-piece construction. This cage is formed from a flat blank of spring steel.

In a second embodiment of the invention, the wall is a plurality of spaced legs. Therein, each spaced leg includes a locking tab for engaging the return bend on the second tube end. In this second embodiment, a retaining band mounts externally of the spaced legs thereby enveloping them.

Another object of the invention is a method of positively connecting the tube ends which comprises the steps of forming a mount on a first tube a predetermined distance from the end of the first tube. A locking means having a spring tab lanced inwardly in a direction away from the end is affixed on the first tube at the mount. A return bend is formed on an end of a second tube. The second tube having the return bend is slip fit over the first tube throughout the predetermined distance and the tab is cammed to pass the return bend. After the tab has passed the return bend, the return bend is captured between the mount and the tab locking the tubes against axial displacement.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 4a is a perspective view of the coupling constructed in accordance with a second embodiment of the invention for the connection of two tube ends oriented with respect to the coupling and in fragmentary elevation;

FIG. 4b is a view of a retaining band on the coupling of FIG. 4a;

FIG. 5 is a sectional view taken along lines 5—5 in FIG. 4, including the two tube ends, illustrating the second embodiment of the coupling connecting two tube ends; and FIG. 6 is a view in elevation taken along the arrow 6 in FIG. 5 illustrating only the coupling.

BEST MODE FOR CARRYING OUT THE INVENTION

Figure 1:
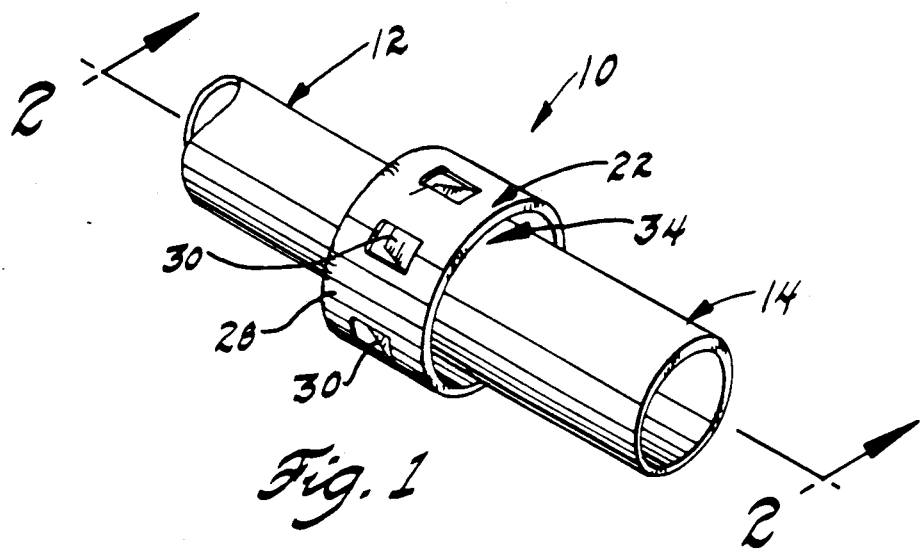
FIG. 1 is a perspective view of a coupling constructed in accordance with a first embodiment of the present invention illustrating the connection of two tube ends.
Figure 2:
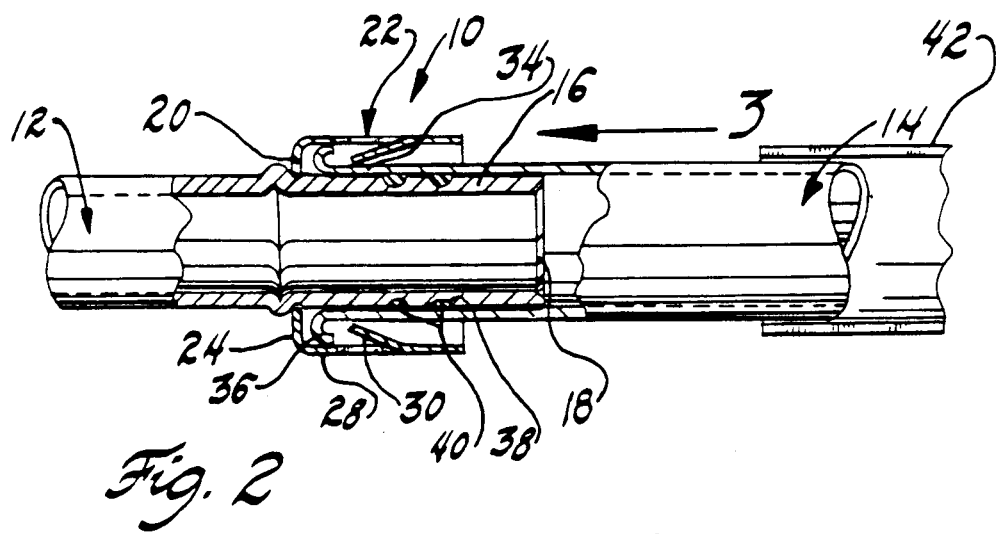
FIG. 2 is a sectional view partly in elevation taken along the lines 2—2 in FIG. 1 illustrating the coupling connecting two tube ends and a tool for effecting disassembly thereof.
Figure 3:
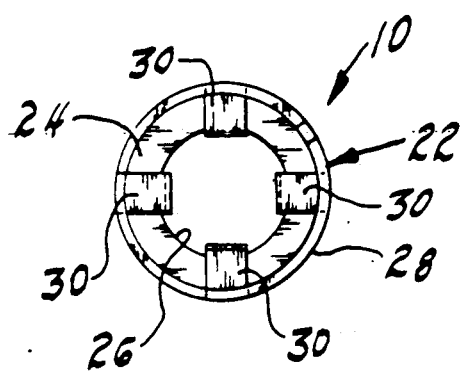
FIG. 3 is a view in elevation taken along arrow 3 in FIG. 2 illustrating only the coupling.

With reference to FIGS. 1 through 3 of the drawings, a tube coupling constructed in accordance with a first embodiment of the present invention is generally indicated by reference numeral 10 and is used for coupling together a first tube 12 and a second tube 14. As is more fully hereinafter described, the tube coupling 10 provides a visible connection and is as easily connected as it is disconnected.

As illustrated in FIGS. 1 through 3, an arrangement of the coupling 10 includes a first tube 12 having an end portion 16 including a terminal end 18. First tube 12 also includes a mounting means or mount 20 a predetermined distance from the terminal end 18. A cage 22 is mounted externally of the end portion 16 by mount 20 to prevent axial movement of the cage on first tube 12.

Cage 22 includes a radial base portion 24 having a circular aperture 26 through which the first tube end portion 16 projects. A wall 28 extends generally perpendicularly to the base portion 24. A locking tab 30 formed in wall 28 extends at an inclination from the wall toward the aperture 26 in the base 24.

A second tube 14 has an end portion 34 including a terminal end 36. Terminal end 36 includes a return bend. Second tube 14 is telescopically mountable over the end portion 16 of the first tube 2. As the second tube 14 is slid over the end portion of the first tube 12, during the coupling of the first and second tubes, the return bend 36 captures the locking tab 30 of the cage 22 to prevent disconnection of the first and second tube end portions 16,34. Thereby, a continuous fluid passageway is formed.

A second embodiment of the coupling is shown in FIGS. 4 through 6 and generally indicated by reference numeral 100. In the second embodiment of FIGS. 4 through 6, corresponding structure to structure in the first embodiment is referenced by the same reference numeral plus 100. In the second embodiment, wall 128 is a plurality of spaced legs extending from a base portion 124. Legs 128 have inwardly projecting locking tabs 130 that extend at an inclination from the spaced legs 128 toward the aperture 126 in base portion 124.

In FIG. 4b a retaining band 37 is illustrated. Retaining band 37 mounts externally of spaced legs 128 enveloping them to thereby reinforce coupling 100, allowing greater pressures to be communicated in the fluid passageway formed by first and second tubes 12,14. Retaining band 37 must be large enough to fit over spaced legs 128 and allow the locking tabs 130 to cam, yet not so large as to allow movement of spaced legs outwardly.

As illustrated in FIGS. 1 and 4, couplings 10,100 are of a one-piece spring steel material construction. Couplings 10,100 shown are stamped from a flat blank of spring steel which makes the coupling inexpensive to manufacture.

In both embodiments, the end portion 16 of the first tube 12 has axially spaced grooves 38 formed in its tubular wall. The grooves are adapted to receive conventional O-rings 40, which, in the assemblies shown in FIGS. 2 and 5, are compressed when the end of the second tube 14 is fitted over the end portion 16 of the first tube 12. In the conventional way, this compressed fit seals the connection and prevents leakage of the fluid flowing in the tubes 12,14.

A connection of the tubes 12,14 through the use of coupling 10,100 is best understood with reference to FIGS. 2 and 5. Initially, the cage 22,122 is mounted on the end portion 16 of the first tube 12 a predetermined distance from the terminal end 20 of the first tube. The second tube 14 is telescopically slip fit over the first tube 12 and the locking tabs 30,130 of the cage 22,122 deflect outwardly to allow the return bend 36 of the second tube 14 to pass by the locking tabs. After the passing, locking tabs 30,130 return to their at rest inclination to lock the first and second tubes 12,14 against disconnection and provide a visible connection.

The method for connecting the first and second tubes 12,14 begins by forming a mount 20 a predetermined distance from the end 18 of the first tube 12. The cage 22,122 having locking tabs 30,130 lanced inwardly, is mounted on the end portion 16 of the first tube 12 at the mount 20 so that the locking tabs 30,130 are directed in a direction away from end 20. The return bend 36 is formed on the second tube 14, and the second tube is slip fit in a telescoping relationship over the end 20 of the first tube 12 throughout the end portion 16. As the return bend 36 passes the locking tabs 30, the locking tabs cam outwardly, thereby allowing the return bend 36 to pass the locking tabs. After the return bend 36 passes the locking tabs 30,130 the locking tabs return to their original inclination to capture the return bend 36 between the base 24,124 and the locking tabs.

It can be seen with reference to the drawing figures that it is possible to visualize the connection formed by the arrangement of the coupling connector 10,100 and the first and second tubes 12,14. With reference back to FIG. 2, disassembly of the coupling 10,100 is accomplished with the aid of a tool 42 of a tube shape that cams the locking tabs 30,130 outwardly as the tool is slid along the second tube 14 toward the first tube 12. This allows the return bend 36 to be separated from the stop 18 at which point the two tubes 12,14 can be immediately separated.

While the best mode for carrying out the invention has been described in detail, those familiar with the art to which this invention relates will recognize alternative ways of practicing the invention as defined by the following claims.

What is claimed is:

1. A coupling for joining first and second tubes comprising:
   a cage defined by a radial base portion having an aperture in said radial base portion;
   said radial base portion including a wall extending generally perpendicularly to said base portion;
   said wall including a locking tab stamped radially inwardly from said wall and forming an opening therein, said tab extending from said wall at an inclination from said wall toward said aperture in said base;
   a first tube including an end and having mounting means a predetermined distance from said end for mounting said cage on said first tube;

a second tube including an end having a return bend; and said locking tab engaging the return bend on the second tube end to prevent disconnection of the first and second tube ends and adjacent said opening whereby a visible connection is provided.

2. A coupling for joining first and second tubes comprising:

a first tube, wherein said first tube comprises;
an end portion having a terminal end; and
a mounting means a predetermined distance from said terminal end;
a cage mounted externally of the end portion on said mounting means in axially inwardly spaced relation to said terminal end, wherein said cage comprises;
a radial base portion having a circular aperture through which said first tube end portion projects;
a wall extending generally perpendicularly and connected to said base portion; and
a locking tab extending at an inclination from said wall axially and radially toward said aperture in said base;
a second tube; said second tube comprising:
an end portion having a terminal end telescopically mountable on said first tube end portion; and
a return bend on said telescopically mountable terminal end;
whereby said return bend captures said locking tab of said cage when said second tube is telescopically mounted on said first tube to prevent disconnection of the first and second tube ends.

3. A coupling as in claim 2 wherein said cage is of a one piece construction.

4. A coupling as in claim 3 wherein said cage is of a spring steel material.

5. A coupling as in claim 4 wherein said cage is formed from a flat blank of spring steel.

6. A coupling as in claim 2 wherein said wall is a plurality of spaced legs.

7. A coupling as in claim 6 wherein each said spaced leg includes a locking tab.

8. A coupling as in claim 6 further including a retaining band circumferentially enveloping said spaced legs.

9. A coupling for joining first and second tubes comprising:

a first tube, wherein said first tube comprises;
an end portion having a terminal end; and
a mounting means a predetermined distance from said terminal end;
a cage mounted externally of the end portion on said mounting means in axially inwardly spaced relation to said terminal end, wherein said cage comprises;
a radial base portion having a circular aperture through which said first tube end portion projects;
a plurality of spaced legs extending generally perpendicularly and connected to said base portion; and
a locking tab extending at an inclination from each said leg axially and radially toward said aperture in said base;
a second tube; said second tube comprising;
an end portion having a terminal end telescopically mountable on said first tube end portion; and
a return bend on said telescopically mountable terminal end;
whereby said return bend captures said locking tab of said cage when said second tube is telescopically mounted on said first tube to prevent disconnection of the first and second tube ends.

10. A coupling for joining first and second tubes comprising:

a first tube, wherein said first tube comprises;
an end portion having a terminal end; and
a mounting means a predetermined distance from said terminal end;
a cage mounted externally of the end portion on said mounting means in axially inwardly spaced relation to said terminal end, wherein said cage comprises;
a radial base portion having a circular aperture through which said first tube end portion projects;
a plurality of spaced legs extending generally perpendicularly and connected to said base portion; and
a locking tab extending at an inclination from each said leg axially and radially toward said aperture in said base; and
a retaining band circumferentially enveloping said spaced legs;
a second tube; said second tube comprising;
an end portion having a terminal end telescopically mountable on said first tube end portion; and
a return bend on said telescopically mountable terminal end;
whereby said return bend captures said locking tab of said cage when said second tube is telescopically mounted on said first tube to prevent disconnection of the first and second tube ends.

11. A method of positively connecting first and second telescoping cylindrical tubes comprising the steps of:

affixing to said first tube a locking means having a spring tab lanced radially inwardly in a direction axially away from an end on a first tube; and
slip fitting a second tube over said end of said first tube by camming said spring tab over the end of said second tube whereby said end of said second tube is captured between said locking means and said tab.

12. A method as in claim 11 further including the step of:

forming a mount on said first tube a predetermined distance from said first tube end for affixing said locking means.

13. A method as in claim 11 further including the step of:

forming the end of said second tube into a return bend.

14. A method of positively connecting telescoping cylindrical tubes comprising the steps of:

forming a mount on one of said tubes a predetermined distance from the end of said one tube;
affixing a locking means having a spring tab lanced radially inwardly in a direction axially away from said end on said first tube at said mount;
forming a return bend on the end of the other of said tubes; and
slip fitting said return bend over said first tube throughout said predetermined distance by camming said tab to pass said return bend whereby said return bend is captured between said mount and said tab.

15. A coupling comprising:

a cage defined by a radial base portion;
said radial base portion including a wall extending generally perpendicularly to said base portion;
said wall including a locking tab stamped radially inwardly from said wall and forming an opening therein, said tab extending from said wall at an inclination from said wall radially and axially toward said aperture in said base, and wherein said wall is a plurality of spaced legs.

16. A coupling as in claim 15 wherein each said spaced leg includes a locking tab.

17. A coupling as in claim 15 further including a retaining band circumferentially enveloping said spaced legs.

* * * * *